United States Patent
Hu et al.

(10) Patent No.: US 11,488,383 B2
(45) Date of Patent: Nov. 1, 2022

(54) VIDEO PROCESSING METHOD, VIDEO PROCESSING DEVICE, AND STORAGE MEDIUM

(71) Applicant: Beijing Xiaomi Pinecone Electronics Co., Ltd., Beijing (CN)

(72) Inventors: Jiagao Hu, Beijing (CN); Changxin Liu, Beijing (CN); Fei Wang, Beijing (CN); Pengfei Yu, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 120 days.

(21) Appl. No.: 16/984,527

(22) Filed: Aug. 4, 2020

(65) Prior Publication Data
US 2021/0287009 A1    Sep. 16, 2021

(30) Foreign Application Priority Data
Mar. 11, 2020  (CN) .......................... 202010165769.4

(51) Int. Cl.
*G06V 20/40* (2022.01)

(52) U.S. Cl.
CPC .............. *G06V 20/46* (2022.01); *G06V 20/41* (2022.01); *G06V 20/49* (2022.01)

(58) Field of Classification Search
None
See application file for complete search history.

(56) References Cited

U.S. PATENT DOCUMENTS

| 10,154,228 B1 * | 12/2018 | Van Tuyl Bentley ...................... G11B 27/031 |
| 10,239,456 B1 * | 3/2019 | Tao ........................... B60R 1/04 |
| 10,319,410 B1 * | 6/2019 | Townsend .............. G11B 27/30 |
| 10,567,764 B2 | 2/2020 | Carmel et al. |

(Continued)

FOREIGN PATENT DOCUMENTS

| CN | 102187663 A | 9/2011 |
| CN | 105227999 A | 1/2016 |

(Continued)

OTHER PUBLICATIONS

Wei et al., Good View Hunting: Learning Photo Composition from Dense View Pairs, proceedings of the IEEE Conference on Computer Vision and Pattern Recognition, 2018, pp. 5437-5446.

(Continued)

*Primary Examiner* — Santiago Garcia
(74) *Attorney, Agent, or Firm* — Finnegan, Henderson, Farabow, Garrett & Dunner, L.L.P.

(57) ABSTRACT

A video processing method includes: extracting a plurality of video frames from a source video with a first aspect ratio; clipping each of the plurality of video frames multiple times to generate a plurality of candidate clipping boxes with a second aspect ratio; respectively determining scores of the plurality of candidate clipping boxes of each of the plurality of video frames, the scores representing playing effects of the video frames in response to that each of the candidate clipping boxes is taken as a clipping range; selecting a clipping box of each of the video frames from the plurality of candidate clipping boxes based on the scores; and clipping each of the video frames by using the selected clipping box, and generating a target video with the second aspect ratio.

17 Claims, 5 Drawing Sheets

(56) References Cited

U.S. PATENT DOCUMENTS

| | | | |
|---|---|---|---|
| 11,184,558 B1* | 11/2021 | Zhang | G06N 3/04 |
| 2004/0202349 A1 | 10/2004 | Erol et al. | |
| 2009/0251594 A1 | 10/2009 | Hua et al. | |
| 2013/0050547 A1 | 2/2013 | Blanquart et al. | |
| 2013/0050574 A1* | 2/2013 | Lu | G06V 20/47 |
| | | | 348/E7.003 |
| 2017/0249719 A1 | 8/2017 | Kansara | |
| 2019/0348077 A1* | 11/2019 | Holtz | G11B 27/031 |
| 2020/0004781 A1 | 1/2020 | Pereira et al. | |
| 2020/0026954 A1 | 1/2020 | Rhodes et al. | |
| 2020/0304754 A1* | 9/2020 | Huynh Thien | G11B 27/031 |
| 2021/0224571 A1* | 7/2021 | Vartakavi | G06K 9/6221 |
| 2021/0225005 A1* | 7/2021 | Vartakavi | G06V 10/25 |
| 2021/0327071 A1* | 10/2021 | Vartakavi | G06V 10/267 |
| 2022/0014709 A1* | 1/2022 | Jia | H04N 5/23203 |

FOREIGN PATENT DOCUMENTS

| | | | |
|---|---|---|---|
| CN | 107103583 A | 8/2017 | |
| CN | 107155065 A | 9/2017 | |
| CN | 107396018 A | 11/2017 | |
| CN | 107463912 A | 12/2017 | |
| CN | 108280808 A | 7/2018 | |
| CN | 110062279 A | 7/2019 | |
| CN | 110139107 A | 8/2019 | |
| CN | 110149532 A | 8/2019 | |
| CN | 110189378 A | 8/2019 | |
| CN | 110347877 A | 10/2019 | |
| CN | 110414399 A | 11/2019 | |
| CN | 110602527 A | 12/2019 | |
| CN | 110868631 A | 3/2020 | |
| CN | 112307925 A | 2/2021 | |
| JP | 2005229578 A | 8/2005 | |
| JP | 2019149785 A | 9/2019 | |
| WO | WO 2009141955 A1 | 11/2009 | |

OTHER PUBLICATIONS

Chen et al., Learning to Compose with Professional Photographs on the Web, proceedings of the 25th ACM international conference on Multimedia, Oct. 23-27, 2017, Mountain View, CA, USA, pp. 37-45.

Mai et al., Composition-preserving Deep Photo Aesthetics Assessment, proceedings of the IEEE Conference on Computer Vision and Pattern Recognition, 2016, pp. 497-506.

European Search Report in European Application No. 20191826.5, dated Feb. 3, 2021.

First Office Action of Chinese Application No. 202010165769.4, dated Aug. 13, 2021.

Notice of Reasons for Refusal of Japanese Application No. 2020-125375, dated Oct. 1, 2021.

Notification to Grant Patent Right for Invention of Chinese Application No. 202010165769.4, dated Mar. 22, 2022.

* cited by examiner

VIDEO PROCESSING METHOD, VIDEO PROCESSING DEVICE, AND STORAGE MEDIUM

CROSS-REFERENCE TO RELATED APPLICATIONS

This application is based upon and claims priority to Chinese Patent Application No. 202010165769.4, filed on Mar. 11, 2020, the entire content of which is incorporated herein by reference.

TECHNICAL FIELD

The disclosure relates to the technical field of image video processing, and more particularly, to a video processing method, a video processing device, and a storage medium.

BACKGROUND

An aspect ratio, also known as a height-width ratio, of a source video and an aspect ratio of a display of a current video playing device may be inconsistent. For example, videos shot by users, downloaded from the Internet, etc. may have multiple aspect ratios, and the displays of the users' playing devices may also have multiple aspect ratios. If the aspect ratio of a source video is inconsistent with the aspect ratio of a target display, when the video is played on the target display (for example, a video of which the aspect ratio is 4:3 is played on the target display of which the aspect ratio is 16:9), large black screens may appear on both sides of the display.

In the related art, in order to match the aspect ratio of the played source video with the aspect ratio of the display of the playing device, so as to fill the display with a video picture to provide better user experience, it is usually necessary to scale or clip the video picture.

SUMMARY

According to a first aspect of embodiments of the disclosure, a video processing method may include: extracting a plurality of video frames from a source video with a first aspect ratio; clipping each of the plurality of video frames multiple times to generate a plurality of candidate clipping boxes with a second aspect ratio; respectively determining scores of the plurality of candidate clipping boxes of each of the plurality of video frames, the scores representing playing effects of the video frames in response to that each of the candidate clipping boxes is taken as a clipping range; selecting a clipping box of each of the video frames from the plurality of candidate clipping boxes based on the scores; and clipping each of the video frames by using the selected clipping box, and generating a target video with the second aspect ratio.

According to a second aspect of embodiments of the disclosure, a video processing device may include: a processor, and a memory configured to store instructions executable by the processor, wherein the processor may be configured to: extract a plurality of video frames from a source video with a first aspect ratio; clip each of the plurality of video frames multiple times to generate a plurality of candidate clipping boxes with a second aspect ratio; respectively determine scores of the plurality of candidate clipping boxes of each of the plurality of video frames, the scores representing playing effects of the video frames in response to that each of the candidate clipping boxes is taken as a clipping range; select a clipping box of each of the video frames from the plurality of candidate clipping boxes based on the scores; and clip each of the video frames by using the selected clipping box, and generating a target video with the second aspect ratio.

According to a third aspect of embodiments of the disclosure, a non-transitory computer-readable storage medium is provided. When instructions in the storage medium are executed by a processor of a mobile terminal, the mobile terminal may perform the video processing method in the first aspect.

It should be understood that the above general description and the following detailed description are merely exemplary and explanatory, but do not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
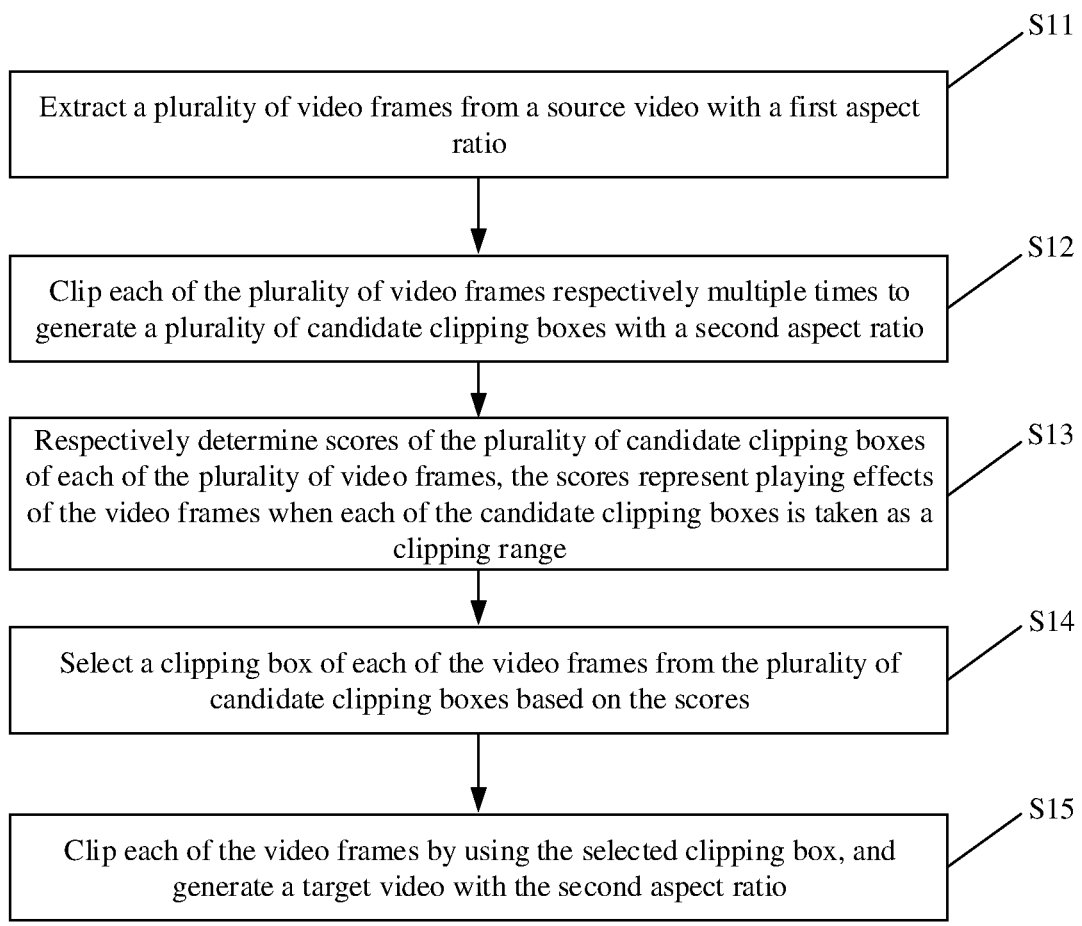
FIG. 1 is a flow chart of a video processing method according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

In the related art, in order to match an aspect ratio of a played source video with an aspect ratio of a display of a playing device so as to fill the display with a video picture to provide better user experience, it is usually necessary to scale or clip the video picture. In a solution of scaling the video picture, the source video is directly scaled to have a target aspect ratio. Since the aspect ratio of the source video is inconsistent with the target aspect ratio, horizontal and vertical scaling factors of the video are necessarily different. This will result in a certain degree of stretching or compression of the picture, which is more obvious when the difference between the two aspect ratios is larger, such that the impression is affected. In another solution, content-sensitive scaling is used. Firstly, important objects/contents in the video are detected and picked out; and then the objects/contents are pasted onto the background which is scaled to have the target aspect ratio. However, the overall processes involve multiple operations such as important object detection, image restoration, scaling, image synthesis, and the like and, therefore the complexity of calculation may be high. In a solution of clipping the video picture, a common manner is to adopt a center clipping method of retaining a center of the video picture, and output the source video to a target display in real time so as to achieve "full-screen playing." In the overall implementation processes, there is no unequal scaling of the contents in vertical and horizontal directions, and all the displayed contents including the background will not be stretched or compressed. However, it is difficult to ensure that key contents of the video are not lost by cutting off redundant contents at both ends of the video and only retaining the center of the video, and it is impossible to maintain the beauty of the clipped picture.

In view of the above, embodiments of the disclosure provide a video processing method. In combination with clipping of fixed areas and video processing of content-sensitive areas, a source video is output according to a target aspect ratio, and the playing effect of output contents may be ensured.

In the embodiments of the disclosure, a plurality of video frames are extracted from a source video, each of the plurality of extracted video frames is respectively clipped multiple times to generate a plurality of candidate clipping boxes with a target aspect ratio, a clipping box is selected based on scores of playing effects of the candidate clipping boxes, and finally the video frames are clipped by using the clipping box to generate a target video with the target aspect ratio. Therefore, the source video may be output according to the target aspect ratio, and the playing effect of the output content may be ensured.

FIG. 1 is a flow chart of a video processing method according to an exemplary embodiment. As illustrated in FIG. 1, the video processing method includes the following operations.

At S11, a plurality of video frames are extracted from a source video with a first aspect ratio.

In the embodiments of the disclosure, the source video may be a video to be processed, and has a certain aspect ratio. For convenience of description, the aspect ratio of the source video is referred to herein as the first aspect ratio.

In the embodiments of the disclosure, the plurality of video frames are extracted from the source video with the first aspect ratio, so as to be converted into images for subsequent clipping. When the plurality of video frames are extracted from the source video, all video frames in the source video may be extracted, or the video frames may be sparsely extracted at equal intervals.

In the embodiments of the disclosure, the number of the plurality of extracted video frames is marked as N, and N is a positive integer.

At S12, each of the plurality of video frames is respectively clipped multiple times to generate a plurality of candidate clipping boxes with a second aspect ratio.

In the embodiments of the disclosure, a rectangular box with a target aspect ratio may be generated at a fixed step size on a full video frame in manner of a sliding window as a candidate clipping box. For convenience of description, the target aspect ratio is referred to herein as the second aspect ratio.

In the embodiments of the disclosure, the number of the plurality of candidate clipping boxes generated by clipping each of the video frames multiple times is marked as M, and M is a positive integer.

In the embodiments of the disclosure, the number of the candidate clipping boxes may be set according to actual needs. In some embodiments, to reduce the number of the candidate clipping boxes and avoid a large number of contents from being clipped out, the size of the sliding window may be limited to be greater than or equal to a preset threshold.

At S13, scores of the plurality of candidate clipping boxes of each of the plurality of video frames are respectively determined, and the scores represent playing effects of the video frames when each of the candidate clipping boxes is taken as a clipping range.

In some embodiments, in order to determine content-sensitive areas, the playing effect when each of the candidate clipping boxes is taken as the clipping range may be scored. High or low scores represent the playing effects of the video frames when each of the candidate clipping boxes is taken as the clipping range.

In an embodiment, the scores of all candidate clipping boxes of each of the video frames may be adjusted, such that there is a clipping box in each of the video frames. In an embodiment, a softmax function is used to adjust the sum of the scores of all candidate clipping boxes of each of the video frames to be 1, such that the weighting score of each of the candidate clipping boxes may represent the playing effect of the video frame when each of the candidate clipping boxes is taken as the clipping range.

In the embodiments of the disclosure, the score of the mth candidate clipping box of the nth frame may be marked as $S_{n,m}$, where n is a positive integer greater than or equal to 1 and less than or equal to N, and m is a positive integer greater than or equal to 1 and less than or equal to M.

At S14, a clipping box of each of the video frames is selected from the plurality of candidate clipping boxes based on the scores.

At S15, each of the video frames is clipped by using the selected clipping box, and a target video with the second aspect ratio is generated.

In the embodiments of the disclosure, each of the plurality of video frames extracted from the source video with the first aspect ratio is respectively clipped multiple times to generate the plurality of candidate clipping boxes with the second aspect ratio, the clipping box is selected based on the scores of the playing effects of the candidate clipping boxes, and the video frames are clipped by using the selected clipping box to generate the target video with the second aspect ratio. Therefore, the source video may be output according to the target aspect ratio, and the playing effect of the output content may be ensured.

In the embodiments of the disclosure, for the N video frames extracted from the source video, the scores of the candidate clipping boxes may be determined frame by frame.

In an embodiment, when the scores of the candidate clipping boxes are determined, image contents in the candidate clipping boxes may be aesthetically scored to obtain the scores of the candidate clipping boxes. In the embodiment, specific implementation processes of aesthetic scoring are not limited. An existing image aesthetic clipping method or image aesthetic scoring method may be used to aesthetically score all M candidate clipping boxes of each of the frames. Then, a softmax function is used to adjust the sum of the scores of all candidate clipping boxes of each of the video frames to be 1, such that scores of all M candidate clipping boxes for each of the frames may be obtained. For example, the score $S_{n,m}$ of the mth candidate clipping box of the nth frame may be obtained.

In another embodiment, when the scores of the candidate clipping boxes are determined, the scoring process may also be performed based on a salient target detection manner. In the embodiment, for each of the candidate clipping boxes in all M candidate clipping boxes of each of the frames, the scores are determined respectively in the following manner: salient target detection is performed for each of pixels in the candidate clipping boxes, and a pixel score of each of the pixels is determined based on a salient target detection result. The scores of the candidate clipping boxes are determined according to the pixel score of each of the pixels in the candidate clipping boxes.

In some embodiments, when a video is played based on the clipping box selected from the candidate clipping boxes of each of the video frames, the problem of frame-to-frame jitter may occur. When the clipping box of each of the video frames is selected in the plurality of candidate clipping boxes based on the scores, the jitter between adjacent frames may be smoothly controlled.

In an embodiment, the process of selecting the clipping box of each of the video frames from the plurality of candidate clipping boxes may be a classification process, and a linear chain conditional random fields (linear-CRF) model is adopted for processing to eliminate the jitter between adjacent frames.

Figure 2:
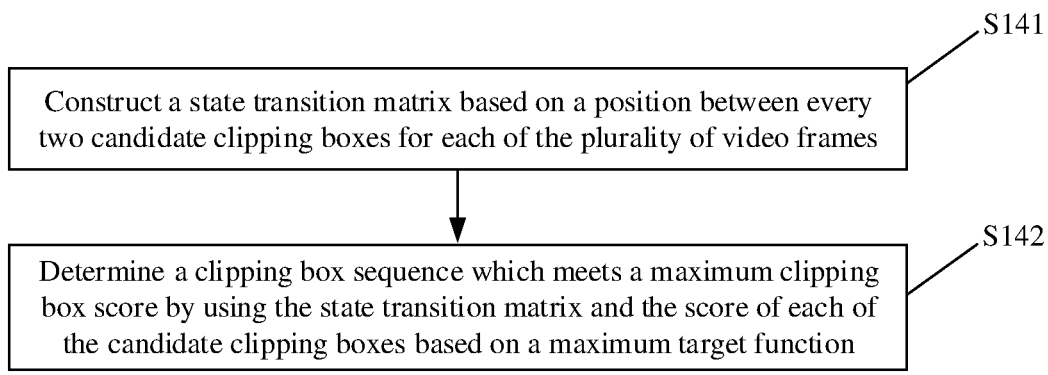
FIG. 2 is a flow chart for implementing smooth control between frames by selecting a clipping box of each of video frames from a plurality of candidate clipping boxes based on scores according to an exemplary embodiment.

FIG. 2 is a flow chart for implementing smooth control between frames by selecting a clipping box of each of video frames for a plurality of candidate clipping boxes based on scores, according to an exemplary embodiment. As illustrated in FIG. 2, the smooth control on the jitter between adjacent frames may include the following operations.

At S141, a state transition matrix is constructed based on a position between every two candidate clipping boxes for each of the plurality of video frames.

The constructed state transition matrix is configured to smoothly control a jitter between adjacent frames for the selected candidate clipping box of each of the video frames.

In the embodiments of the disclosure, the state transition matrix is set according to the difference in a size of a space between the candidate clipping boxes. The state transition matrix may be expressed as: $W \in R^{M \times M}$.

In an embodiment, the state transition matrix may be constructed based on an intersection over union (IoU) between every two candidate clipping boxes and a coefficient multiplier.

If the calculation is based on the IoU between two clipping boxes, a calculation formula may be as follows:

$$W_{i,j} = \alpha \times IoU(R_i, R_j),$$

where $W_{i,j}$ represents a value of the ith row and jth column in the state transition matrix W; $R_i$ represents the ith candidate clipping box; $IoU(R_i, R_j)$ represents calculation of an IoU between the ith candidate clipping box and the jth candidate clipping box; and $\alpha$ is a coefficient multiplier and is configured to control a degree of smoothing, and the degree of smoothing may be controlled by adjusting the size of $\alpha$.

In another embodiment, the state transition matrix may be constructed based on a Euclidean distance between center positions of every two adjacent candidate clipping boxes, areas of the candidate clipping boxes and a coefficient multiplier in the embodiments of the disclosure; and the coefficient multiplier is configured to control a degree of smoothing.

For example, the sizes and center positions of the clipping boxes are considered at the same time, and the following formula may be used to determine the state transition matrix:

$$W_{i,j} = \frac{\alpha}{Diff(Cen_i, Cen_j) + 1} + \frac{\alpha}{\lambda \times (Area_i - Area_j) + 1},$$

where $Cen_i$ represents center coordinates of the ith candidate clipping box; $Area_i$ represents an area of the ith candidate clipping box; a $Diff(Cen_i, Cen_j)$ function is configured to calculate the difference between the center coordinates of two clipping boxes, where the difference may be calculated directly by using a Euclidean distance; $\lambda$ is configured to balance influences of positions of center points and difference of areas, and the influences of change of the areas and change of the positions of the center points may be balanced by adjusting $\lambda$; and $\alpha$ is a coefficient multiplier and is configured to control the degree of smoothing, and the degree of smoothing may be controlled by adjusting the size of $\alpha$.

At S142, a clipping box sequence which meets a maximum clipping box score is determined by using the state transition matrix and the score of each of the candidate clipping boxes based on a maximum target function, and the clipping box sequence includes the selected candidate clipping box of each of the video frames.

In an embodiment, a Viterbi algorithm is used to calculate the following maximum target function, so as to obtain a clipping box sequence $Y = \{y_1, y_2, \ldots, y_N\}$ without frame-to-frame jitter:

$$\max_Y \left\{ \prod_{n=1}^{N} \exp(S_{n,y_n} + W_{y_{n-1}, y_n}) \right\},$$

where $y_i \in [1, M]$ represents a serial number of the selected candidate clipping box of the ith frame; $S_{n,y_n}$ represents a score of the selected yth candidate clipping box of the nth frame; and $W_{y_{n-1}, y_n}$ represents a state transition matrix value corresponding to the selected yth candidate clipping box of the nth frame and the selected yth candidate clipping box of the (n−1)th frame.

In the embodiments of the disclosure, after the above anti jitter smoothing processing, each of the clipping boxes may have no jitter between frames. In some embodiments, the position and size of a candidate clipping box remain unchanged within a period of time, but the candidate clipping box may suddenly jump to another candidate clipping box and remain for a period of time. Such jump of the clipping box may cause the jump and incoherence of the finally output video content. Therefore, smoothing for the change of such clipping box may be performed, including smoothing of the movement and scaling of the clipping box, so as to adjust the position of the clipping box.

Figure 3:
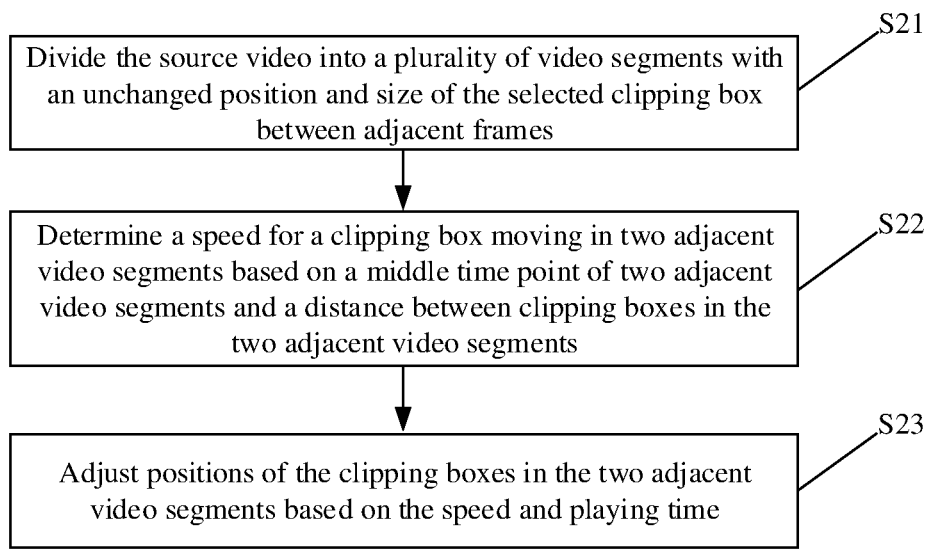
FIG. 3 is a flow chart of a method for adjusting positions of clipping boxes according to an exemplary embodiment.

FIG. 3 is a flow chart of a method for adjusting positions of clipping boxes according to an exemplary embodiment. As illustrated in FIG. 3, the method for adjusting positions of clipping boxes includes the following operations.

At S21, the source video is divided into a plurality of video segments with an unchanged position and size of the selected clipping box between adjacent frames.

In the embodiments of the disclosure, each of the video segments with the unchanged position and size of the clipping box may be determined. It is assumed that a total number of the plurality of video segments is K, and K is a positive integer greater than 1.

At S22, a speed for a clipping box moving in two adjacent video segments is determined based on a middle time point of each of the two adjacent video segments and a distance between the clipping boxes in the two adjacent video segments.

In the embodiment, it is assumed that the duration of the kth video is $T_k$, and the middle time point is $t_k$, where k∈[1,K]. A vector $Box_k=[x1_k,y1_k,x2_k,y2_k]$ is configured to represent the clipping box of the kth video, where $x1_k,y1_k$ are respectively horizontal and vertical coordinates of an upper left vertex of the clipping box, and $x2_k,y2_k$ are respectively horizontal and vertical coordinates of a lower right vertex of the clipping box.

When the movement speed of the clipping box is determined, the following formula may be used to calculate the speed at which the clipping box moves from the kth segment to the (k+1)th segment:

$$v_k = \frac{Box_{k+1} - Box_k}{(T_k + T_{k+1})/2},$$

where the subtraction of the clipping box refers to the subtraction of four coordinates respectively. Each value in the calculated speed $v_k=[v1_k,v2_k,v3_k,v4_k]$ corresponds to the movement speed of each of the coordinates along a specific axis, that is, $v1_k,v3_k$ are respectively movement speeds of the upper left vertex and the lower right vertex along an x axis, and $v2_k,v4_k$ are respectively movement speeds of the upper left vertex and the lower right vertex along a y axis.

At S23, positions of the clipping boxes in the two adjacent video segments are adjusted based on the speed for the clipping box moving in the two adjacent video segments and playing time.

In the embodiment, for a first video segment, if the playing time is less than a middle time point of the first video segment, a position of the clipping box in the first video segment is kept unchanged.

When k∈[1,K−1], for a kth video segment and a (k+1)th video segment, if the playing time is greater than or equal to a middle time point of the kth video segment and less than a middle time point of the (k+1)th video segment, the clipping box in the kth video segment is adjusted to move a first distance; the first distance is a product of a first speed and a first time, the first speed is a speed at which the clipping box moves from the kth video segment to the (k+1)th video segment, and the first time is a difference between a current time and the middle time point of the kth video segment.

For a Kth video segment, if the playing time is greater than a middle time point of the Kth video segment, a position of the clipping box in the Kth video segment is kept unchanged.

In the embodiments of the disclosure, for any time t, the following formula may be used to calculate the position $B_t$ of the clipping box at this time:

$$B_t = \begin{cases} Box_1, & t < t_1 \\ Box_k + v_k \times (t - t_k), & t_k \le t < t_{k+1}, (k \in [2, K-1]), \\ Box_K, & t > t_K \end{cases}$$

where if $t<t_1$ (that is, the front half segment of the first segment of video), 则 $B_t=Box_1$. If $t>t_K$ (that is, the rear half segment of the last segment of video), $B_t=Box_K$. For k∈[1, K−1], $t_k \le t < t_{k+1}$, $B_t=Box_k+v_k\times(t-t_k)$.

In the embodiments of the disclosure, each of the video frames in the source video may be clipped in the above manner to generate clipping boxes, and the clipping boxes generated by clipping have the same aspect ratio. The clipping boxes having the same aspect ratio are scaled to have the same resolution and then recombined into a video, and then a target video may be obtained and output. Therefore, the source video may be output according to a target aspect ratio, and the playing effect of the output content may be ensured.

Embodiments of the disclosure further provide a video processing device. It can be understood that in order to realize the above functions, the video processing device includes corresponding hardware structures and/or software modules for performing the functions. The embodiments of the disclosure may be implemented in hardware, or software, or a combination of hardware and software. Whether a function is performed by hardware or computer software driving hardware depends on the specific applications.

Figure 4:
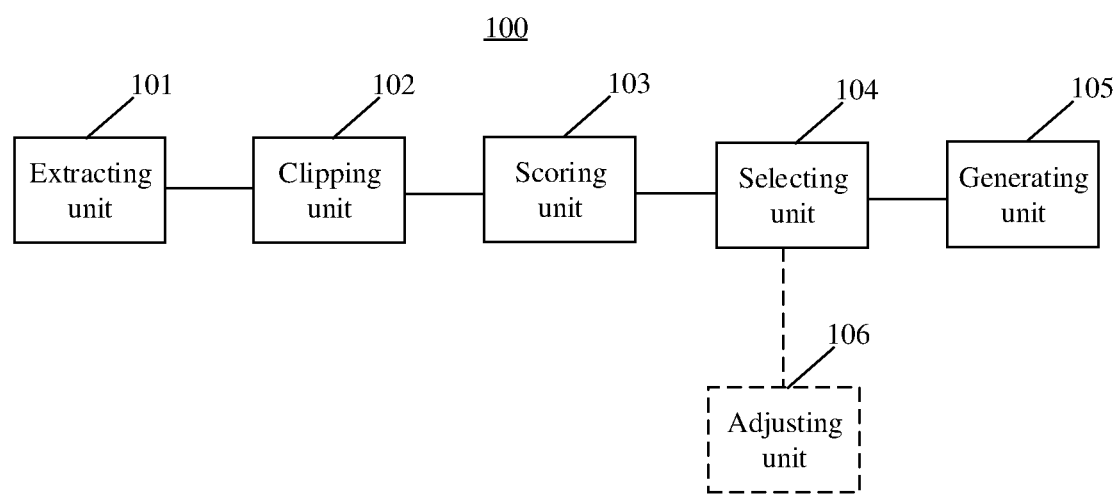
FIG. 4 is a block diagram of a video processing device according to an exemplary embodiment.

FIG. 4 is a block diagram of a video processing device 100 according to an exemplary embodiment. Referring to FIG. 4, the video processing device 100 includes an extracting unit 101, a clipping unit 102, a scoring unit 103, a selecting unit 104 and a generating unit 105.

The extracting unit 101 is configured to extract a plurality of video frames from a source video with a first aspect ratio. The clipping unit 102 is configured to clip each of the plurality of video frames multiple times to generate a plurality of candidate clipping boxes with a second aspect ratio. The scoring unit 103 is configured to respectively determine scores of the plurality of candidate clipping boxes of each of the plurality of video frames, and the scores represent playing effects of the video frames in response to that each of the candidate clipping boxes is taken as a clipping range. The selecting unit 104 is configured to select a clipping box of each of the video frames from the plurality of candidate clipping boxes based on the scores. The generating unit 105 is configured to clip each of the video frames by using the selected clipping box, and generate a target video with the second aspect ratio.

In an embodiment, the scoring unit 103 is configured to aesthetically score image contents in the candidate clipping boxes to obtain the scores of the candidate clipping boxes.

In another embodiment, the scoring unit 103 is configured to perform salient target detection for each of pixels in the candidate clipping boxes, and determine a pixel score of each of the pixels based on a salient target detection result; and determine the scores of the candidate clipping boxes according to the pixel score of each of the pixels in the candidate clipping boxes.

In another embodiment, in selecting the clipping box of each of the video frames from the plurality of candidate clipping boxes based on the scores, the selecting unit 104 is further configured to: construct a state transition matrix based on a position between every two candidate clipping boxes for each of the plurality of video frames, the state transition matrix being configured to smoothly control a jitter between adjacent frames for the selected candidate clipping box of each of the video frames; and determine a clipping box sequence which meets a maximum clipping box score by using the state transition matrix and the score of each of the candidate clipping boxes based on a maximum target function, the clipping box sequence including the selected candidate clipping box of each of the video frames.

In another embodiment, the selecting unit 104 is configured to construct the state transition matrix based on an IoU between every two candidate clipping boxes and a coefficient multiplier; and the coefficient multiplier is configured to control a degree of smoothing.

In another embodiment, the selecting unit 104 is configured to construct the state transition matrix based on a Euclidean distance between center positions of every two adjacent candidate clipping boxes, areas of the candidate clipping boxes and a coefficient multiplier; and the coefficient multiplier is configured to control a degree of smoothing.

In another embodiment, the video processing device 100 further includes an adjusting unit 106, and the adjusting unit 106 is configured to: divide the source video into a plurality of video segments with an unchanged position and size of the selected clipping box between adjacent frames after the clipping box of each of the video frames is selected by the selecting unit 104; determine a speed at which the clipping box will move in two adjacent video segments based on a middle time point of each of the two adjacent video segments and a distance between the clipping boxes in the two adjacent video segments; and adjust positions of the clipping boxes in the two adjacent video segments based on the speed and playing time.

In another embodiment, a total number of the plurality of video segments is K, and K is a positive integer greater than 1. The adjusting unit 106, in adjusting the positions of the clipping boxes in the two adjacent video segments based on the speed and the playing time, is further configured to: for a first video segment, in response to that the playing time is less than a middle time point of the first video segment, keep a position of the clipping box in the first video segment unchanged; for a kth video segment and a (k+1)th video segment, in response to that the playing time is greater than or equal to a middle time point of the kth video segment and less than a middle time point of the (k+1)th video segment, adjust the clipping box in the kth video segment to move a first distance; the first distance being a product of a first speed and a first time, the first speed being a speed at which the clipping box moves from the kth video segment to the (k+1)th video segment, the first time being a difference between a current time and the middle time point of the kth video segment, and k being a positive integer which meets the following conditions: 1<k<K−1; and for a Kth video segment, in response to that the playing time is greater than a middle time point of the Kth video segment, keep a position of the clipping box in the Kth video segment unchanged.

With respect to the device embodiments described above, specific manners for performing operations by individual units therein have been described in detail in the method embodiments, which will not be repeated herein.

Figure 5:
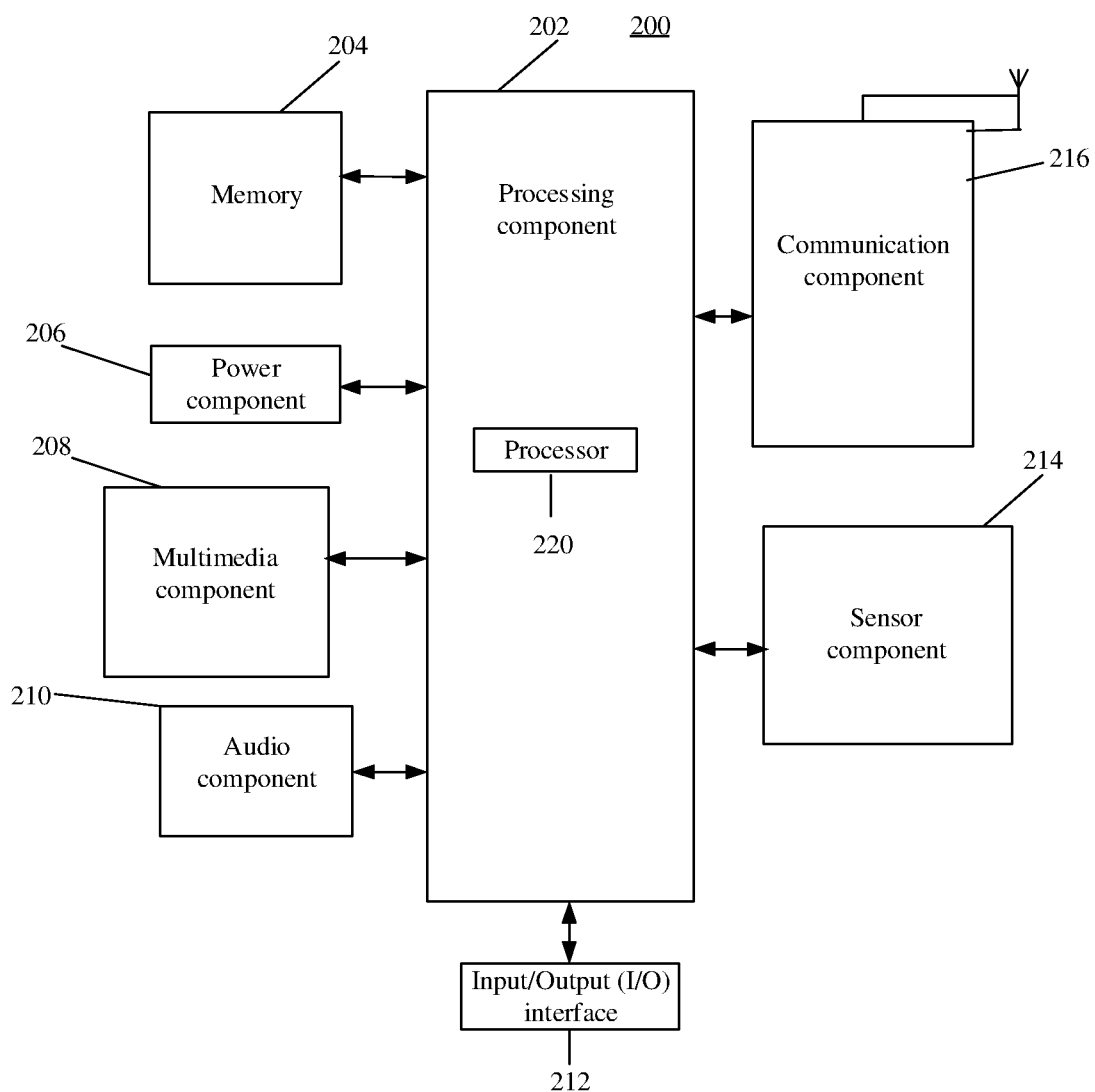
FIG. 5 is a block diagram of a video processing device according to an exemplary embodiment.

FIG. 5 is a block diagram of a device 200 for video processing according to an exemplary embodiment. For example, the device 200 may be a mobile phone, a computer, a digital broadcast terminal, a messaging device, a gaming console, a tablet, a medical device, exercise equipment, a personal digital assistant, and the like.

Referring to FIG. 5, the device 200 may include one or more of the following components: a processing component 202, a memory 204, a power component 206, a multimedia component 208, an audio component 210, an input/output (I/O) interface 212, a sensor component 214 and a communication component 216.

The processing component 202 usually controls overall operations of the device 200, such as the operations associated with display, telephone calls, data communications, camera operations, and recording operations. The processing component 202 may include one or more processors 220 to execute instructions to complete all or part of the steps in the above method. Furthermore, the processing component 202 may include one or more modules which facilitate interaction between the processing component 202 and other components. For example, the processing component 202 may include a multimedia module to facilitate interaction between the multimedia component 208 and the processing component 202.

The memory 204 is configured to store various types of data to support the operation of the device 200. Examples of such data include instructions for any applications or methods operated on the device 200, contact data, phonebook data, messages, pictures, video, and the like. The memory 204 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 206 provides power for various components of the device 200. The power component 206 may include a power management system, one or more power supplies, and other components associated with generation, management and distribution of power for the device 200.

The multimedia component 208 includes a screen providing an output interface between the device 200 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes, and gestures on the TP. The touch sensors may not only sense a boundary of a touch or swipe action, but also detect a period of time and a pressure associated with the touch or swipe action. In some embodiments, the multimedia component 208 includes a front camera and/or a rear camera. When the device 200 is in an operation mode, such as a photographing mode or a video mode, the front camera and/or the rear camera may receive external multimedia data. Each of the front camera and the rear camera may be a fixed optical lens system or have focusing and optical zooming capabilities.

The audio component 210 is configured to output and/or input an audio signal. For example, the audio component 210 includes a microphone (MIC), and the MIC is configured to receive an external audio signal when the device 200 is in an operation mode, such as a call mode, a recording mode and a voice recognition mode. The received audio signal may further be stored in the memory 204 or sent through the communication component 216. In some embodiments, the audio component 210 further includes a speaker configured to output the audio signal.

The I/O interface 212 provides an interface between the processing component 202 and peripheral interface modules, such as a keyboard, a click wheel, buttons, and the like. The buttons may include, but are not limited to: a home button, a volume button, a starting button, and a locking button.

The sensor component 214 includes one or more sensors configured to provide status assessments in various aspects for the device 200. For example, the sensor component 214 may detect an on/off status of the device 200 and relative positioning of components, such as a display and small keyboard of the device 200, and the sensor component 214 may also detect a change in a position of the device 200 or a component of the device 200, presence or absence of contact between the user and the device 200, orientation or acceleration/deceleration of the device 200, and a change in temperature of the device 200. The sensor component 214 may include a proximity sensor configured to detect presence of an object nearby without any physical contact. The sensor component 214 may also include a light sensor, such as a complementary metal oxide semiconductor (CMOS) or charge coupled device (CCD) image sensor, configured for use in an imaging application. In some embodiments, the sensor component 214 may also include an acceleration sensor, a gyroscope sensor, a magnetic sensor, a pressure sensor or a temperature sensor.

The communication component 216 is configured to facilitate wired or wireless communication between the device 200 and other devices. The device 200 may access a communication-standard-based wireless network, such as a wireless fidelity (WiFi) network, a 4th-generation (4G) or 5th-generation (5G) network, or a combination thereof. In an exemplary embodiment, the communication component 216 receives a broadcast signal or broadcast associated information from an external broadcast management system through a broadcast channel. In an exemplary embodiment, the communication component 216 also includes a near field communication (NFC) module to facilitate short-range communications. In an exemplary embodiment, the communication component 216 may be implemented based on a radio frequency identification (RFID) technology, an infrared data association (IrDA) technology, an ultra-wide band (UWB) technology, a Bluetooth (BT) technology, and other technologies.

In an exemplary embodiment, the device 200 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the above method.

In an exemplary embodiment, there is also provided a non-transitory computer-readable storage medium including instructions, such as included in the memory 204, executable by the processor 220 of the device 200 to perform the above methods. For example, the non-transitory computer-readable storage medium may be a ROM, a random access memory (RAM), a compact disc read-only memory (CD-ROM), a magnetic tape, a floppy disc, an optical data storage device, and the like.

Terms used in this disclosure are for the purpose of describing exemplary embodiments only and are not intended to limit the disclosure. For example, the terms "first", "second", and the like are used to describe various types of information, but the information should not be limited to the terms. The terms are only used to distinguish the same type of information from each other, and do not indicate a specific order or degree of importance. For example, without departing from the scope of the disclosure, first information may also be referred to as second information. Similarly, second information may also be referred to as first information.

Although the operations in the embodiments of the disclosure are described in a specific order in the drawings, it should not be understood that the operations are required to be performed in a specific order shown or in a serial order, or all the operations shown are required to be performed to obtain a desired result. In some embodiments, multitasking and parallel processing may be advantageous.

Other embodiments of the present disclosure will be apparent to those skilled in the art from consideration of the specification and practice of the disclosure. The present application is intended to cover any variation, use or adaptation of the disclosure that follows the general principles of the disclosure and includes common knowledge or conventional technical means in the technical field not disclosed in the disclosure. The specification and the embodiments are exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

What is claimed is:

1. A video processing method, comprising:
extracting a plurality of video frames from a source video with a first aspect ratio;
clipping each of the plurality of video frames multiple times to generate a plurality of candidate clipping boxes with a second aspect ratio;
respectively determining scores of the plurality of candidate clipping boxes of each of the plurality of video frames, the scores representing playing effects of the video frames in response to that each of the candidate clipping boxes is taken as a clipping range;
selecting a clipping box of each of the video frames from the plurality of candidate clipping boxes based on the scores; and
clipping each of the video frames by using the selected clipping box, and generating a target video with the second aspect ratio;
wherein each of the candidate clipping boxes is a rectangular box with the second aspect ratio which is generated at a fixed step size on a video frame in a manner of a sliding window; and
wherein selecting the clipping box of each of the video frames from the plurality of candidate clipping boxes based on the scores comprises:
constructing a state transition matrix based on a position between every two candidate clipping boxes for each of the plurality of video frames, the state transition matrix being configured to smoothly control a jitter between adjacent frames for the selected candidate clipping box of each of the video frames; and
determining a clipping box sequence which meets a maximum clipping box score by using the state transition matrix and the score of each of the candidate clipping boxes based on a maximum target function, the clipping box sequence comprising the selected candidate clipping box of each of the video frames.

2. The video processing method of claim 1, wherein determining the scores of the candidate clipping boxes comprises:
aesthetically scoring image contents in the candidate clipping boxes to obtain the scores of the candidate clipping boxes.

3. The video processing method of claim 1, wherein determining the scores of the candidate clipping boxes comprises:
performing salient target detection for each of pixels in the candidate clipping boxes, and determining a pixel score of each of the pixels based on a salient target detection result; and
determining the scores of the candidate clipping boxes according to the pixel score of each of the pixels in the candidate clipping boxes.

4. The video processing method of claim 1, wherein constructing the state transition matrix based on the position between every two candidate clipping boxes comprises:
 constructing the state transition matrix based on an intersection over union (IoU) between every two candidate clipping boxes and a coefficient multiplier, the coefficient multiplier being configured to control a degree of smoothing.

5. The video processing method of claim 1, wherein constructing the state transition matrix based on the position between every two candidate clipping boxes comprises:
 constructing the state transition matrix based on a Euclidean distance between center positions of every two adjacent candidate clipping boxes, areas of the candidate clipping boxes, and a coefficient multiplier, the coefficient multiplier being configured to control a degree of smoothing.

6. The video processing method of claim 1, wherein after the clipping box of each of the video frames is selected, further comprising:
 dividing the source video into a plurality of video segments with an unchanged position and size of the selected clipping box between adjacent frames;
 determining a speed for a clipping box moving in two adjacent video segments based on a middle time point of the two adjacent video segments and a distance between the clipping boxes in the two adjacent video segments; and
 adjusting positions of the clipping boxes in the two adjacent video segments based on the speed and playing time.

7. The video processing method of claim 6, wherein a total number of the plurality of video segments is K, and K is a positive integer greater than 1;
 wherein adjusting the positions of the clipping boxes in the two adjacent video segments based on the speed and the playing time comprises:
 for a first video segment, in response to that the playing time is less than a middle time point of the first video segment, keeping a position of the clipping box in the first video segment unchanged;
 for a kth video segment and a (k+1)th video segment, in response to that the playing time is greater than or equal to a middle time point of the kth video segment and less than a middle time point of the (k+1)th video segment, adjusting the clipping box in the kth video segment to move a first distance, the first distance being a product of a first speed and a first time, the first speed being a speed at which the clipping box moves from the kth video segment to the (k+1)th video segment, the first time being a difference between a current time and the middle time point of the kth video segment, and k is a positive integer and 1<k<K−1; and
 for a Kth video segment, in response to that the playing time is greater than a middle time point of the Kth video segment, keeping a position of the clipping box in the Kth video segment unchanged.

8. A video processing device, comprising:
 a processor; and
 a memory for storing instructions executable by the processor;
 wherein the processor is configured to:
 extract a plurality of video frames from a source video with a first aspect ratio;
 clip each of the plurality of video frames multiple times to generate a plurality of candidate clipping boxes with a second aspect ratio;
 respectively determine scores of the plurality of candidate clipping boxes of each of the plurality of video frames; the scores representing playing effects of the video frames in response to that each of the candidate clipping boxes is taken as a clipping range;
 select a clipping box of each of the video frames from the plurality of candidate clipping boxes based on the scores; and
 clip each of the video frames by using the selected clipping box, and generate a target video with the second aspect ratio;
 wherein each of the candidate clipping boxes is a rectangular box with the second aspect ratio which is generated at a fixed step size on a video frame in a manner of a sliding window; and
 wherein in selecting the clipping box of each of the video frames from the plurality of candidate clipping boxes based on the scores, the processor is further configured to:
 construct a state transition matrix based on a position between every two candidate clipping boxes for each of the plurality of video frames, the state transition matrix being configured to smoothly control a jitter between adjacent frames for the selected candidate clipping box of each of the video frames; and
 determine a clipping box sequence which meets a maximum clipping box score by using the state transition matrix and the score of each of the candidate clipping boxes based on a maximum target function, the clipping box sequence comprising the selected candidate clipping box of each of the video frames.

9. The video processing device of claim 8, wherein in determining the scores of the candidate clipping boxes, the processor is further configured to:
 aesthetically score image contents in the candidate clipping boxes to obtain the scores of the candidate clipping boxes.

10. The video processing device of claim 8, wherein in determining the scores of the candidate clipping boxes, the processor is further configured to:
 perform salient target detection for each of pixels in the candidate clipping boxes, and determine a pixel score of each of the pixels based on a salient target detection result; and
 determine the scores of the candidate clipping boxes according to the pixel score of each of the pixels in the candidate clipping boxes.

11. The video processing device of claim 8, wherein in constructing the state transition matrix based on the position between every two candidate clipping boxes, the processor is further configured to:
 construct the state transition matrix based on an intersection over union (IoU) between every two candidate clipping boxes and a coefficient multiplier, the coefficient multiplier being configured to control a degree of smoothing.

12. The video processing device of claim 8, wherein in constructing the state transition matrix based on the position between every two candidate clipping boxes, the processor is further configured to:
 construct the state transition matrix based on a Euclidean distance between center positions of every two adjacent candidate clipping boxes, areas of the candidate clipping boxes, and a coefficient multiplier, the coefficient multiplier being configured to control a degree of smoothing.

13. The video processing device of claim 8, wherein the processor is further configured to:
    divide the source video into a plurality of video segments with an unchanged position and size of the selected clipping box between adjacent frames after the clipping box of each of the video frames is selected;
    determine a speed for a clipping box moving in two adjacent video segments based on a middle time point of the two adjacent video segments and a distance between the clipping boxes in the two adjacent video segments; and
    adjust positions of the clipping boxes in the two adjacent video segments based on the speed and playing time.

14. The video processing device of claim 13, wherein a total number of the plurality of video segments is K, and K is a positive integer greater than 1;
    wherein in adjusting the positions of the clipping boxes in the two adjacent video segments based on the speed and the playing time, the processor is further configured to:
    for a first video segment, in response to that the playing time is less than a middle time point of the first video segment, keep a position of the clipping box in the first video segment unchanged;
    for a kth video segment and a (k+1)th video segment, in response to that the playing time is greater than or equal to a middle time point of the kth video segment and less than a middle time point of the (k+1)th video segment, adjust the clipping box in the kth video segment to move a first distance, the first distance being a product of a first speed and a first time, the first speed being a speed at which the clipping box moves from the kth video segment to the (k+1)th video segment, the first time being a difference between a current time and the middle time point of the kth video segment, and k is a positive integer and 1<k<K−1; and
    for a Kth video segment, in response to that the playing time is greater than a middle time point of the Kth video segment, keep a position of the clipping box in the Kth video segment unchanged.

15. A non-transitory computer-readable storage medium having stored therein instructions that, when executed by a processor of a mobile terminal, causes the mobile terminal to perform a video processing method comprising:
    extracting a plurality of video frames from a source video with a first aspect ratio;
    clipping each of the plurality of video frames multiple times to generate a plurality of candidate clipping boxes with a second aspect ratio;
    respectively determining scores of the plurality of candidate clipping boxes of each of the plurality of video frames, the scores representing playing effects of the video frames in response to that each of the candidate clipping boxes is taken as a clipping range;
    selecting a clipping box of each of the video frames from the plurality of candidate clipping boxes based on the scores; and
    clipping each of the video frames by using the selected clipping box, and generating a target video with the second aspect ratio;
    wherein each of the candidate clipping boxes is a rectangular box with the second aspect ratio which is generated at a fixed step size on a video frame in a manner of a sliding window; and
    wherein selecting the clipping box of each of the video frames from the plurality of candidate clipping boxes based on the scores comprises:
    constructing a state transition matrix based on a position between every two candidate clipping boxes for each of the plurality of video frames, the state transition matrix being configured to smoothly control a jitter between adjacent frames for the selected candidate clipping box of each of the video frames; and
    determining a clipping box sequence which meets a maximum clipping box score by using the state transition matrix and the score of each of the candidate clipping boxes based on a maximum target function, the clipping box sequence comprising the selected candidate clipping box of each of the video frames.

16. The non-transitory computer-readable storage medium of claim 15, wherein determining the scores of the candidate clipping boxes comprises:
    aesthetically scoring image contents in the candidate clipping boxes to obtain the scores of the candidate clipping boxes.

17. The non-transitory computer-readable storage medium of claim 15, wherein determining the scores of the candidate clipping boxes comprises:
    performing salient target detection for each of pixels in the candidate clipping boxes, and determining a pixel score of each of the pixels based on a salient target detection result; and
    determining the scores of the candidate clipping boxes according to the pixel score of each of the pixels in the candidate clipping boxes.

* * * * *